(12) United States Patent
Casale et al.

(10) Patent No.: US 10,860,981 B1
(45) Date of Patent: *Dec. 8, 2020

(54) SYSTEMS AND METHODS FOR CAPTURING, PREDICTING AND SUGGESTING USER PREFERENCES IN A DIGITAL HUDDLE ENVIRONMENT

(71) Applicant: MASSACHUSETTS MUTUAL LIFE INSURANCE COMPANY, Springfield, MA (US)

(72) Inventors: Robert Casale, Bristol, CT (US); Abigail O'Malley, Brighton, MA (US); Kedzie Teller, Brookline, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 3 days.

This patent is subject to a terminal disclaimer.

(21) Appl. No.: 16/435,409

(22) Filed: Jun. 7, 2019

Related U.S. Application Data

(63) Continuation of application No. 14/733,497, filed on Jun. 8, 2015, now Pat. No. 10,354,226.

(60) Provisional application No. 62/008,948, filed on Jun. 6, 2014, provisional application No. 62/008,888, filed on Jun. 6, 2014, provisional application No. 62/008,896, filed on Jun. 6, 2014, provisional application No. 62/008,916, filed on Jun. 6, 2014, provisional application No. 62/008,937, filed on Jun. 6, 2014.

(51) Int. Cl.
*G06F 3/0482* (2013.01)
*G06Q 10/10* (2012.01)
*G06F 16/2457* (2019.01)
*H04L 29/06* (2006.01)

(52) U.S. Cl.
CPC ......... *G06Q 10/103* (2013.01); *G06F 3/0482* (2013.01); *G06F 16/24578* (2019.01); *H04L 63/08* (2013.01); *H04L 65/403* (2013.01)

(58) Field of Classification Search
CPC ............ G06Q 10/103; G06F 16/24578; G06F 3/0482; G06F 3/0481; H04L 63/08; H04L 65/403
See application file for complete search history.

(56) References Cited

U.S. PATENT DOCUMENTS

| | | |
|---|---|---|
| 7,062,511 B1 | 6/2006 | Poulsen |
| 7,802,207 B2 | 9/2010 | Agboatwalla et al. |
| 7,827,494 B1 | 11/2010 | Hedayatpour et al. |
| 8,072,439 B2 | 12/2011 | Hillis et al. |
| 8,181,115 B2 | 5/2012 | Irving |
| 8,407,576 B1 | 3/2013 | Yin et al. |
| 9,594,823 B2 | 3/2017 | Chaney et al. |

(Continued)

*Primary Examiner* — Anil K Bhargava
(74) *Attorney, Agent, or Firm* — Foley & Lardner LLP

(57) ABSTRACT

A systems and method for capturing, predicting and suggesting user preferences in a huddle collaboration environment is disclosed. The disclosed method may store user interaction between different modules of the huddle collaboration environment in the database. A data processing module may then compare the data from a single user or from different users in order to determine patterns or similarities which may indicate a preference to specific configurations on the system. The system may then suggest configuration according to the needs or preferences of the user or apply them automatically to the huddle collaboration environment.

18 Claims, 6 Drawing Sheets

(56) References Cited

U.S. PATENT DOCUMENTS

| | | |
|---|---|---|
| 9,705,835 B2 | 7/2017 | Burge |
| 9,852,398 B1 | 12/2017 | Casale et al. |
| 9,852,399 B1 | 12/2017 | Casale et al. |
| 9,880,718 B1 | 1/2018 | Casale et al. |
| 10,303,347 B1 | 5/2019 | Casale et al. |
| 10,498,747 B1 | 12/2019 | Meaney et al. |
| 2003/0046401 A1* | 3/2003 | Abbott ............ G06F 9/451 709/228 |
| 2003/0120599 A1 | 6/2003 | Agboatwalla et al. |
| 2004/0107256 A1* | 6/2004 | Odenwald ............ H04L 29/06 709/205 |
| 2006/0036969 A1 | 2/2006 | Guido et al. |
| 2007/0078953 A1 | 4/2007 | Chai et al. |
| 2007/0240063 A1 | 10/2007 | Cheng et al. |
| 2008/0263024 A1* | 10/2008 | Landschaft ......... G06F 16/9537 |
| 2009/0113378 A1 | 4/2009 | Boyer et al. |
| 2009/0119280 A1 | 5/2009 | Waters et al. |
| 2009/0133069 A1 | 5/2009 | Conness et al. |
| 2009/0204906 A1* | 8/2009 | Irving ............ H04N 7/15 715/753 |
| 2009/0216634 A1 | 8/2009 | Peltonen et al. |
| 2009/0307604 A1 | 12/2009 | Giles et al. |
| 2009/0320035 A1 | 12/2009 | Ahlgren et al. |
| 2010/0070881 A1* | 3/2010 | Hanson ............ G06Q 10/06 715/753 |
| 2010/0100626 A1 | 4/2010 | Allen et al. |
| 2010/0192072 A1 | 7/2010 | Spataro et al. |
| 2010/0218090 A1* | 8/2010 | Amit ............ G06F 40/103 715/247 |
| 2011/0022991 A1* | 1/2011 | Hillis ............ G06F 3/017 715/863 |
| 2011/0113348 A1 | 5/2011 | Twiss et al. |
| 2011/0246340 A1 | 10/2011 | Dahod et al. |
| 2011/0270923 A1 | 11/2011 | Jones et al. |
| 2012/0110087 A1 | 5/2012 | Culver et al. |
| 2012/0124484 A1 | 5/2012 | Robinson et al. |
| 2012/0159359 A1 | 6/2012 | Ehrler et al. |
| 2012/0210247 A1 | 8/2012 | Khouri et al. |
| 2012/0278738 A1 | 11/2012 | Kruse et al. |
| 2012/0284635 A1 | 11/2012 | Sitrick et al. |
| 2012/0290950 A1 | 11/2012 | Rapaport et al. |
| 2013/0014023 A1 | 1/2013 | Lee et al. |
| 2013/0091140 A1 | 4/2013 | Attwell et al. |
| 2013/0091440 A1* | 4/2013 | Kotler ............ G06Q 10/10 715/753 |
| 2013/0218978 A1 | 8/2013 | Weinstein et al. |
| 2013/0254658 A1 | 9/2013 | Nestler et al. |
| 2014/0006977 A1 | 1/2014 | Adams |
| 2014/0033265 A1* | 1/2014 | Leeds ............ G06F 21/10 726/1 |
| 2014/0040257 A1 | 2/2014 | Chandrasekaran |
| 2014/0082525 A1 | 3/2014 | Kass et al. |
| 2014/0143295 A1 | 5/2014 | Girsch et al. |
| 2014/0172485 A1 | 6/2014 | Thean |
| 2014/0172799 A1 | 6/2014 | Dorman |
| 2014/0181676 A1 | 6/2014 | Samborskyy et al. |
| 2014/0189818 A1 | 7/2014 | Meyer |
| 2014/0282106 A1 | 9/2014 | Smith et al. |
| 2014/0282135 A1 | 9/2014 | Segre |
| 2014/0298259 A1 | 10/2014 | Meegan et al. |
| 2014/0337778 A1 | 11/2014 | Armitage |
| 2015/0067058 A1* | 3/2015 | Vellozo Luz ............ H04L 67/14 709/204 |
| 2015/0089353 A1 | 3/2015 | Folkening |
| 2015/0095802 A1* | 4/2015 | Huang ............ H04L 65/1089 715/753 |
| 2015/0120577 A1* | 4/2015 | Lobo ............ G06Q 10/103 705/301 |
| 2015/0149929 A1* | 5/2015 | Shepherd ............ H04L 65/403 715/753 |
| 2015/0229533 A1 | 8/2015 | Vida et al. |
| 2016/0100019 A1 | 4/2016 | Leondires |
| 2019/0114334 A1 | 4/2019 | Gunther |
| 2019/0287188 A1 | 9/2019 | Colafranceschi |

\* cited by examiner

SYSTEMS AND METHODS FOR CAPTURING, PREDICTING AND SUGGESTING USER PREFERENCES IN A DIGITAL HUDDLE ENVIRONMENT

CROSS-REFERENCE TO RELATED APPLICATIONS

This application is a continuation of co-pending U.S. patent application Ser. No. 14/733,497, filed Jun. 8, 2015 (now U.S. Pat. No. 10,354,226), which claims priority to U.S. Provisional Patent Application Ser. No. 62/008,888, filed Jun. 6, 2014, U.S. Provisional Patent Application Ser. No. 62/008,896, filed Jun. 6, 2014, U.S. Provisional Patent Application Ser. No. 62/008,916, filed Jun. 6, 2014, U.S. Provisional Patent Application Ser. No. 62/008,937, filed Jun. 6, 2014, and U.S. Provisional Patent Application Ser. No. 62/008,948, filed Jun. 6, 2014, all of which are hereby incorporated by reference in their entirety.

TECHNICAL FIELD

The present disclosure relates in general to collaboration systems and, more specifically, to customizing sub-applications and dashboards in a digital huddle environment.

BACKGROUND

Conventionally, team members working on one or more projects within a company may get together in a huddle or micromeeting on a regular basis to share information, discuss topics, evaluate performance, identify issues and/or solve problems collaboratively. Since the introduction of the huddle, whiteboards have acted as the traditional tool for storing all information collected during the huddle time. However, it may not be possible for all participants in a meeting to be in the same physical location at the same time, which may create a need for modifying the current huddle methodology.

Alternatives to overcome the challenge of gathering team members at different locations for a huddle may include the use of one or more collaboration tools such as conference phone calls, video conferences, Internet relay chat (IRC), and instant messaging, among others. Nevertheless, the whiteboard is still the most commonly used tool in huddle boards, because the aforementioned collaboration tools are generic ways to connect people and may not offer a consistent way to realize the benefits of team huddle. As a result, all team members must be physically located in the same room in order to be fully engaged in the huddle session.

Other alternatives to overcome the above drawbacks are systems configurations that enable remote huddle collaboration between team members of a given project content, which may take many forms including contact information, calendar items, mail, audio, photos, documents, and tasks or actions. A huddle user interface may include a predefined region for applications that can function as a home screen for a user, providing relevant content and quick access to collaboration tools. Applications' regions provide users with a predefined view or dashboard to monitor the current state of a subset of content obtainable through a computing device. Individual applications provide users with access to applications, application content, remote content and/or independent functionality. Typically, applications regions are represented in a small or thumbnail view that provides some minimal amount of information. One or more applications regions can provide a user with the data and tasks most likely to be relevant to the particular user. Nevertheless, it is likely that a library of applications may not meet the needs of every huddle board.

Conventional approaches to meetings amongst remote users fail address all of the deficiencies of the conventional collaboration tools. A web meeting may allow a user to share a computer desktop with another user in a remote location. But the user must select which application should be presented on the computer desktop, so there is no ability to present a page that has information from multiple sub-applications that are dynamically updated. Further, the user cannot include annotations overlaid on the page that are simultaneously presented to the remote user and also stored with that particular page such that the particular page can be retrieved at a later date along with those annotations.

Moreover, conventional extranets are capable of sharing information from a common source, but these extranets do not offer real-time collaboration through real-time updates and simultaneous displays to other users. Further, these conventional extranets do not utilize sub-applications that dynamically display data associated with users simultaneously accessing the extranet. Conventional computer solutions do not offer the desired collaboration, real-time updating, dynamic presentation of data, and linking of additional content to the displayed data.

Therefore, there is still a need for a huddle user interface that allows users to create their own applications and optimize the presentation of content within a digital huddle environment.

SUMMARY

Described herein are systems and methods that address the shortcomings described above, and may also provide a number of other benefits as well. The embodiments described herein may be systems and methods for capturing, predicting, and suggesting user preferences in a huddle collaboration environment, where the system may be implemented as part of devices hosting a huddle collaboration system.

In one embodiment, a computer-implemented method comprises receiving, by an authentication module of a huddle management server, a user credential of a first user transmitted from a computing device of the first user; authenticating, by the authentication module of the huddle management server, the user credential of the first user; determining, by the authentication module of the huddle management server, which huddle records are associated with the first user; granting, by the authentication module of the huddle management server, access to the first user for the huddle records associated with the first user upon authentication of the user credential; receiving, by a data processing module of the huddle management server, a selection by the user of a huddle record associated with the first user; designating, by the data processing module of the huddle management server, the selected huddle record as an active huddle; identifying, by a data processing module of the huddle management server, at least two sub-applications associated with the selected huddle record designated as the active huddle; instructing, by the data processing module of the huddle management server, execution of each of the at least two sub-applications associated with the selected huddle record, wherein each of the sub-applications dynamically queries a database for data records associated with the huddle record; presenting, by the data processing module of the huddle management server, a graphical representation of the selected huddle collaboration file on the computing device of the first user, wherein the graphical representation comprises an initial view of the at least two sub-applications having a first set of information for each of the least two sub-applications simultaneously displayed in the graphical representation; receiving, by the data processing module of the huddle management server, an indication that one of the at least two sub-applications has been activated by the computing device of the first user; storing, by the data processing module of the huddle management server, the indication that one of the at least two sub-applications has been activated by the computing device of the first user; and serving, by the data processing module of the huddle management server, a revised version of the initial view of the graphical representation comprising an alternative arrangement of the at least two sub-applications based upon at least the indication.

In one aspect, serving the revised version comprises ranking, by the data processing module of the huddle management server, each sub-application based upon at least the indication to determine the sub-application having the most activations.

In another aspect, serving the revised version comprises ranking, by the data processing module of the huddle management server, each sub-application based upon at least the indication to determine the sub-application having the most display time on the graphical representation.

In yet another aspect, serving the revised version comprises dynamically reconfiguring, by the data processing module of the huddle management server, the graphical representation of the huddle record based upon an automatic detection of the user's most common actions.

In another embodiment, a computer-implemented method comprises receiving, by an authentication module of a huddle management server, a user credential of a first user transmitted from a computing device of the first user; authenticating, by the authentication module of the huddle management server, the user credential of the first user; determining, by the authentication module of the huddle management server, which huddle records are associated with the first user; granting, by the authentication module of the huddle management server, access to the first user for the huddle records associated with the first user upon authentication of the user credential; receiving, by a data processing module of the huddle management server, a selection by the user of a huddle record associated with the first user; designating, by the data processing module of the huddle management server, the selected huddle record as an active huddle; identifying, by a data processing module of the huddle management server, at least two sub-applications associated with the selected huddle record designated as the active huddle; instructing, by the data processing module of the huddle management server, execution of each of the at least two sub-applications associated with the selected huddle record, wherein each of the sub-applications dynamically queries a database for data records associated with the huddle record; presenting, by the data processing module of the huddle management server, a graphical representation of the selected huddle collaboration file on the computing device of the first user, wherein the graphical representation comprises an initial view of the at least two sub-applications having a first set of information for each of the least two sub-applications simultaneously displayed in the graphical representation; receiving, by the data processing module of the huddle management server, a first indication that one of the at least two sub-applications has been activated by the computing device of the first user; storing, by the data processing module of the huddle management server, the first indication that one of the at least two sub-applications has been activated by the computing device of the first user; receiving, by the data processing module of the huddle management server, a second indication that one of the at least two sub-applications has been activated by the computing device of the first user; storing, by the data processing module of the huddle management server, the second indication that one of the at least two sub-applications has been activated by the computing device of the first user; ranking, by the data processing module of the huddle management server, each sub-application based upon at least the first indication and the second indication to determine the sub-application having the most activations; serving, by the data processing module of the huddle management server, a revised version of the initial view of the graphical representation comprising an alternative arrangement of a location of at least two sub-applications on the graphical representation based upon at least the ranking.

In yet another embodiment, a collaboration system comprises a data store including a description associated with a huddle board display page having at least two sub-applications and an association with more than one user, wherein the first huddle board display page has information from a first sub-application and a second sub-application, and wherein the huddle board display page has a first huddle board display page having a first link associated with an object of the information from the first sub-application for a second huddle board display page having information from a first sub-application a second link associated with an object of the information from the second sub-application for a third huddle board display page having information from a second sub-application; and a computer processor coupled to the data store and in communication through the Internet and programmed to: receive a signal indicating activation of the first or second links displayed by the first huddle board display page or the second huddle board display page, upon receiving an indication that a sub-application has been activated by a user computer in Internet communication with the first huddle board display page, serve the second huddle board display page based upon the description in the data store and with content generated by the activated sub-application, and serve a revised version of the first huddle board display page including an alternative configuration of the at least two sub-applications on the first huddle board display page based upon at least the indication that the sub-application has been activated by the user computer.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
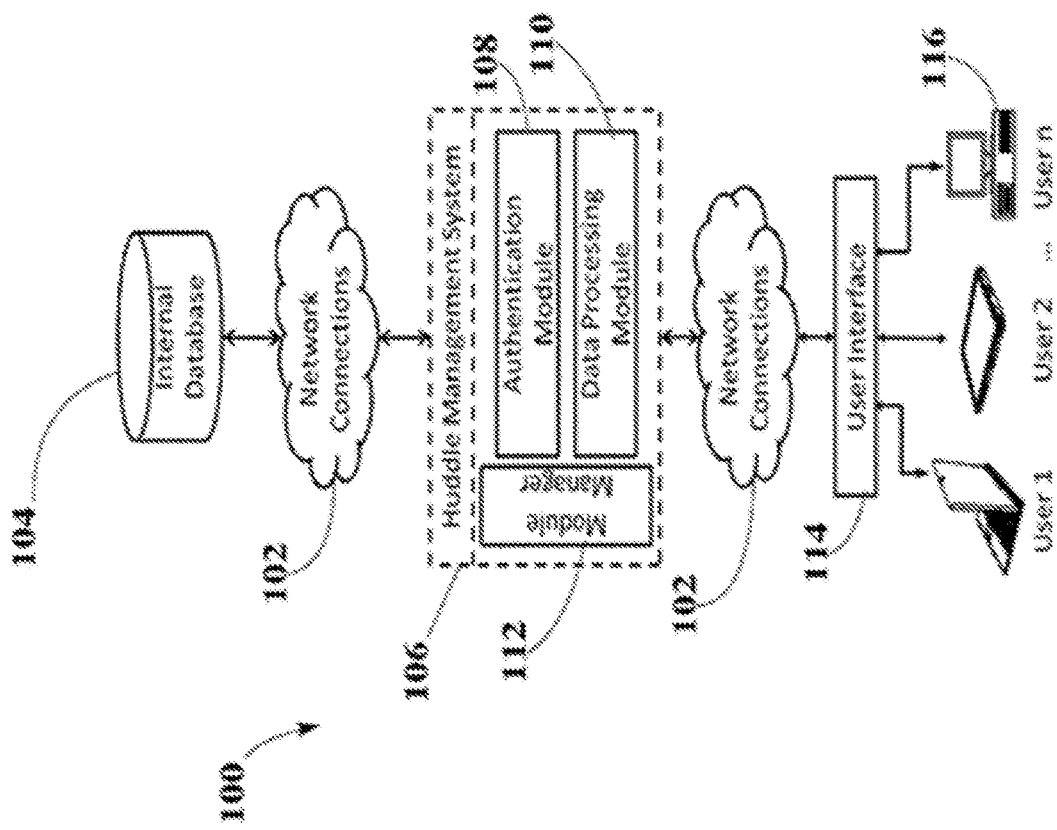
FIG. 1 is a block diagram of an exemplary system architecture for a digital huddle collaboration system, according to an embodiment.

The present disclosure is here described in detail with reference to embodiments, which form a part here. Other embodiments may be used and/or other changes may be made without departing from the spirit or scope of the present disclosure. The illustrative embodiments described in the detailed description are not meant to be limiting of the subject matter presented here.

As used here, the following terms may have the following definitions:

"Huddle" refers to a group of two or more members that belong to a project or an organizational team, brought together on a regular basis to recognize outstanding contributions, evaluate performance, identify issues, and solve problems collaboratively.

"Huddle board" refers to a Huddle-Up screen which contains sub-applications.

"Huddle summary" refers to a user interface generated by a huddle collaboration system which may show one or more sub-applications in the huddle board, and each sub-application may display a summary-level view of the data it may contain.

"Leader" refers to a team member that may initiate and manage a huddle session. A leader may have an additional set of permissions that may include for example, the ability to create huddle boards, configure or otherwise modify a huddle session, among others.

"Sub-application" refers to a software tool that may enable remote collaboration between authenticated team members in a digital huddle environment.

"User's Huddle Boards" refers to a user interface generated by a huddle collaboration system which may display a list of the user's huddle boards in which he/she may be participating in, and a list of public boards which may be viewed by anyone in the company.

"Active Huddle" refers to a huddle board which a leader may have started and to which one or more participants may join remotely through a huddle collaboration system.

Embodiments described herein provide a system that may allow for customizing sub-applications and dashboards in a digital huddle environment. The system may employ data management systems and methods in order to allow a user to customize application regions and dashboards of a digital huddle user interface.

Additionally, the present disclosure relates to a method for customizing sub-applications and dashboards in a digital huddle environment. The method for customizing sub-applications and dashboards in a digital huddle environment may include a system that may be used to process users customization options applying a huddle management system capable perform and keep record of the user preferences. The disclosed method may use internal information sources.

According to an embodiment, a computer-implemented huddle collaboration system may include different components which may dynamically interact with each other through network connections. The huddle collaboration system may include one or more internal databases operatively coupled to a huddle management system, among other components. The huddle management system may include one or more authentication modules, one or more data processing modules, and one or more module managers, among other software modules. The huddle collaboration system may also include any suitable user interface through which users, such as huddle leaders and huddle participants, may interact with the huddle management system by means of a computing device. The computing device may be any computer type device that may receive, process, and/or transmit digital data including a bus which may enable the communication between components such as input/output devices, an interface, a memory, a storage device, and a central processing unit (CPU), among others.

According to another embodiment, a computer-implemented method for remote huddle collaboration may allow users to perform actions for accessing the huddle collaboration system, entering the user's credentials, entering the user's huddle boards, selecting a huddle board, and entering the huddle board summary. If the user is joining a huddle board as a leader, then the method may also allow a leader to perform actions for selecting "start" a huddle session, entering the huddle board, conducting the huddle board by selecting one or more sub-applications to edit/view the content in the huddle board, ending the huddle session, and exiting the huddle collaboration system, among others. If the user is joining a huddle board as a participant, then the method may allow a participant to perform actions for selecting "join" a huddle session, entering a waiting state for the huddle session until the huddle is active or entering the huddle board if the huddle is already active, engaging in the huddle session, ending the huddle session, and exiting the huddle collaboration system, among others. If the user is not joining a huddle board but wants to edit/view the content in a huddle board, then the method may allow users to perform actions for selecting one or more sub-application to edit/view the content in the huddle board, and exiting the huddle collaboration system, among others.

The system may enable a user to access different huddle boards through a huddle board navigation user interface (UI). The system may also provide a user with a huddle summary UI from where a user may access different sub-applications for each huddle board. The system may also allow a user to customize the huddle summary UI as well as sub-applications.

The system includes a method for capturing and storing each user navigation action in a database. The system may include a data processing module that may analyze and process the navigation actions for each user in order to identify patterns, user preferences or needs. Whenever a user preference is determined by the system for a specific user, the system may automatically suggest to the user or automatically implement changes to the huddle board collaboration system in order to satisfy that user's preferences or needs.

The processing module may also analyze and process customizations for each user in order to identify patterns, user preferences or needs. Whenever a user preference is determined by the system for a specific user, the system may automatically suggest to the user, or automatically implement customizations to the different components of the huddle board collaboration system in order to satisfy that user's preferences or needs.

Exemplary System Components and Architecture

FIG. 1 shows a system architecture 100 for a huddle collaboration system, according to an embodiment. The disclosed system architecture 100 may include different components which may dynamically interact with each other through network connections 102. Network connections 102 may refer to any suitable connection between computers, such as for example intranets, local area networks (LAN), virtual private networks (VPN), wireless area networks (WAN), and the internet, among others.

System architecture 100 may include one or more internal databases 104 and a huddle management system 106, among other components. Internal database 104 may store data generated by one or more software modules operating within huddle management system 106, data and files uploaded by a user such as a team leader or a team participant, and the credential of each authorized user of the organization to allow them access and modify huddle boards, among others. Internal database 104 may grant access to huddle management system 106 when needed, and may be implemented through known in the art database management systems (DBMS), such as, for example, MySQL, PostgreSQL, SQLite, Microsoft SQL Server, Microsoft Access, Oracle, SAP, dBASE, FoxPro, IBM DB2, LibreOffice Base, FileMaker Pro, and/or any other type of database that may organize collections of data.

Huddle management system 106 may be operatively coupled to internal database 104 through suitable network connections 102, and may include one or more authentication modules 108, one or more data processing modules 110, one or more module managers 112, and any other suitable software module required for the proper operation of huddle management system 106. Each software module within huddle management system 106 may include a processing unit for running related algorithms or computer executable program instructions that may be executed by a server, a single computer, or multiple computers in a distributed configuration; and may be configured to interact with one or more software modules of the same or different type operating within huddle management system 106. Each processing unit may include a processor with computer-readable medium, such as a random access memory (RAM) coupled to the processor. Examples of a processor may include a microprocessor, an application specific integrated circuit (ASIC), and a field programmable object array (FPOA), among others.

Huddle management system 106 may generate a suitable user interface 114 on a client computing device 116 through which a user, such as a team leader and/or a team participant, may interact with one or more software modules operating within huddle management system 106. Client computing device 116 may be any computer type device such as smartphones, desktop computers, laptop computers, tablets, PDAs, and/or another type of processor-controlled device that may receive, process, and/or transmit digital data. In addition, user interface 114 may be configured to collect information from one or more internal databases 104, and receive and/or feed information to one or more users interacting with client computing device 116.

According to some embodiments of the present disclosure, huddle management system 106 may generate user interface 114 which may request and/or collect information from one or more client computing devices 116 through which users may interact with user interface 114 via an input device, such as a touch screen, a mouse, a keyboard, a keypad, and others. Authentication module 108 may receive the user's credentials through client computing device 116 and may validate them in order to assign authorization to access, start, edit, and/or manage one or more huddle boards and/or sub-applications in the huddle board. Data processing module 110 may receive and process information collected during huddle time, and may store this information in internal database 104 when needed. Data processing module 110 may also be configured to automatically retrieve information requested by one or more client computing devices 116 and/or one or more software modules, where this information may be obtained from internal database 104 and/or the suitable operation of one or more software modules within huddle management system 106. Module manager 112 may interact with one or more software modules operating within huddle management system 106, in addition to controlling the operation of huddle collaboration system and processing requests from one or more client computing devices 116 and/or one or more software modules, among other activities. Huddle management system 106 may generate user interface 114 which may display the content in a huddle to one or more users in the form of one or more sub-applications (not shown). Internal database 104 may store any suitable data generated from the operation of one or more software modules within huddle management system 106 and may make it available for further analysis performed by one or more software modules within huddle management system 106, and/or one or more users.

Figure 2:
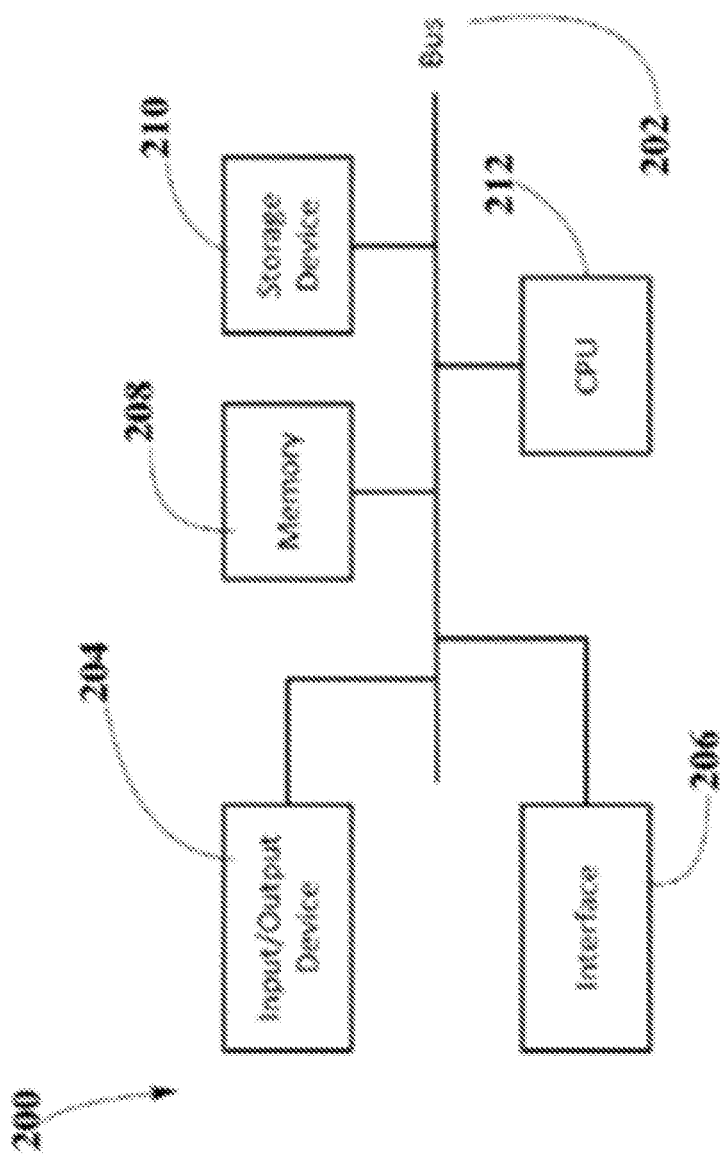
FIG. 2 is a block diagram of example components in a computing device, in which one or more embodiments of the present disclosure may operate.

FIG. 2 is a block diagram of example components in a computing device 200, in which one or more embodiments of the present disclosure may operate.

According to some aspects of this embodiment computing device 200 may correspond to a server, a client computing device, a smartphone, a desktop computer, a laptop computer, a tablet, a PDA, and/or another type of processor-controlled device that may receive, process, and/or transmit digital data, among others. Computing device 200 may include a bus 202, an input/output device 204, an interface 206, a memory 208, a storage device 210, and a central processing unit (CPU) 212. In another embodiment, computing device 200 may include additional, fewer, different, and/or differently arranged components than are illustrated in FIG. 2.

Bus 202 may include a path which may allow components within computing device 200 to communicate with each other. Input/output device 204 may include peripherals and/or other mechanisms that may enable a user to input information to computing device 200, including for example a keyboard, a mouse, a button, a touch screen, voice recognition, and biometric mechanisms, among others. Input/output device 204 may also include a mechanism that may output information to the user of computing device 200 such as, for example, a display, a light emitting diode (LED), and a speaker, among others. Interface 206 may include mechanisms that may enable computing device 200 to communicate with other computing devices 200 and/or systems through network connections. Network connections may refer to any suitable connections between computers such as, for example, intranets, local area networks (LAN), virtual private networks (VPN), wireless area networks (WAN) and the internet among others. Memory 208 may include a random access memory (RAM) or another type of dynamic storage device 210 which may store information and instructions for execution by central processing unit (CPU) 212. Storage device 210 may include a magnetic and/or optical recording medium such as read-only memory, flash memory, ferroelectric RAM (F-RAM) hard disks, floppy disks, and optical discs, among others. Central processing unit (CPU) 212 may include a microprocessor, an application specific integrated circuit (ASIC), or field programmable object array (FPOA), among others, which may interpret and execute instructions.

According to some embodiments of the present disclosure, at least one computing device 200 may perform certain operations to conduct huddles digitally required for the proper operation of a huddle collaboration system. Computing devices 200 may perform these operations in response to a central processing unit (CPU) 212 executing software instructions that may be contained in a computer-readable medium, such as memory 208.

The software instructions may be read into memory 208 from another computer-readable medium, such as storage device 210, or from another computing device 200 via interface 206. The software instructions contained in memory 208 may cause central processing unit (CPU) 212 to perform one or more suitable processes which may be further described later. Alternatively, hardwired circuitry may be used in place of or in combination with software instructions to implement processes described herein. Thus, implementations described herein are not limited to any specific combination of hardware circuitry and software.

Figure 3:
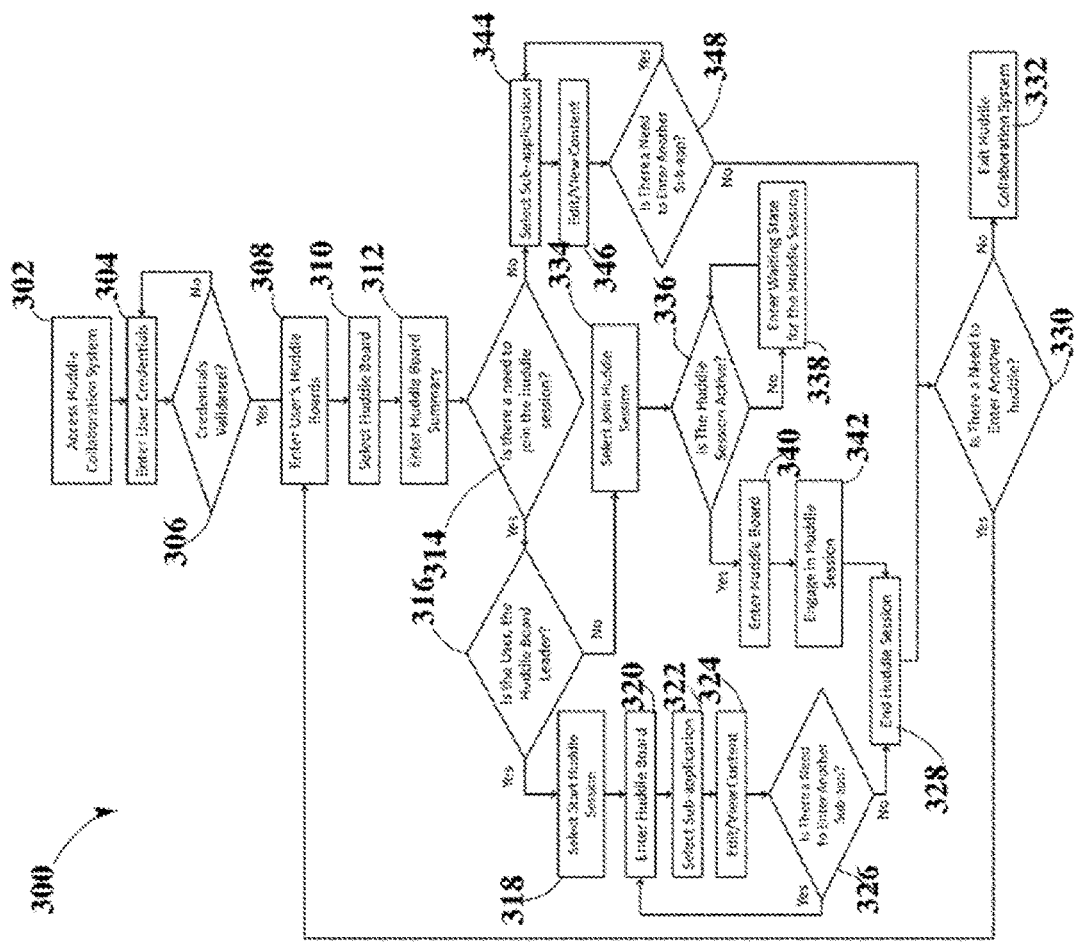
FIG. 3 is a flowchart of a method for remote huddle collaboration, according to another embodiment.

FIG. 3 is a flowchart of a method 300 for remote huddle collaboration, according to another embodiment.

Method 300 for remote huddle collaboration may be executed by a huddle collaboration system that may include different components which may dynamically interact with each other.

Method 300 for remote huddle collaboration may start at step 302, when a user, such as a huddle leader or a huddle participant within a company, may launch a website of a huddle collaboration system through a client computing device. This huddle collaboration system may generate a login screen as an initial user interface, through which the user may enter his/her company's credentials at step 304, via an input device such as a touch screen, a mouse, a keyboard, a keypad, and others. If authentication module operating within huddle management system of huddle collaboration system can validate the user's credentials at step 306, then at step 308, huddle collaboration system may display the user's huddle boards navigation UI that may show a list of the huddle boards in which he/she may be participating in and a list of public boards, where these public boards may be viewed by anyone in the organization and may be edited only by authorized users. The user's huddle boards may also provide the user with a feature which may allow them to search for public huddle boards that may not be displayed in the list and for which they may have authorized access, and a feature which may allow authorized users to create a new huddle board. At step 306, if authentication module cannot validate the user's credentials, then, huddle collaboration system may request the user to enter his/her credentials at least one more time at step 304 or deny access.

At step 310, users, such as a huddle leader and a huddle participant of a company, may select a huddle board they may wish to participate in from their huddle board navigation UI via an input device, and then at step 312, huddle collaboration system may display a huddle summary UI of the selected board. This huddle summary may show all the sub-applications in the huddle board, and each sub-application may display a summary-level view of the data it may contain. Sub-applications that may be shown in the user's huddle summary may one or a combination of text-based, image-based, or -numeric-based, and may include, but is not limited to, recognition, morale, announcements, key projects, dates/calendar, field metrics, FYI news feed, leader standard work, employee sentiment, (e.g., information), and customer sentiment.

At step 314, the user may evaluate whether there is a need to join the selected huddle in an active session. If there is a need to join a huddle in an active session, then at step 316, the user may evaluate whether he/she may wish to enter the selected huddle board as a leader or as a huddle participant. If the user may wish to enter the selected huddle board as a leader at step 316, then at step 318, he/she may select a "start" huddle option which may be available on an options menu of the selected board's huddle summary via an input device. Next, at step 320 huddle management system may allow the huddle leader to enter the huddle board to conduct the huddle session. In the huddle board, the huddle leader may have access to view and/or edit the content in the huddle which may be available to the huddle leader in the form of one or more sub-applications according to the huddle configurations. At step 322, the huddle leader may select one of the available sub-applications in order to view with further details and/or edit the content in the selected sub-application at step 324. Afterwards, if there is a need to enter another sub-application at step 326, the user may navigate back to the huddle management system may enabling the user to select another sub-application at step 322. If there is no need to enter another sub-app at step 326, then the huddle leader may end and leave the huddle session at step 328. Subsequently at step 330, the huddle leader may determine whether there is a need to enter another huddle board. If there is a need to enter another huddle at step 330, then, huddle management system may display the user's huddle boards navigation UI, which may allow the huddle leader to select another huddle board at step 310. Otherwise, the huddle leader may exit huddle collaboration system at step 332, and method 300 may end.

In another embodiment, if the user selects to enter a huddle board as a participant at step 316, then at step 334, he/she may select the "join" huddle option which may be available on the options menu of the selected board's huddle summary via an input device. Then at step 336, authentication module may determine whether the huddle leader has started the huddle session. If the huddle leader has not started the huddle session, module manager operating within huddle management system of huddle collaboration system may enable the huddle participant to enter a waiting state for the selected huddle at step 338, until the huddle leader starts the huddle session at step 318. Otherwise, huddle management system may allow the huddle participant to enter the huddle board at step 340 and engage in the huddle session at step 342. In the huddle board, the huddle participant may have access to view the content in the huddle which may be available to the user in the form of one or more sub-applications according to the huddle configurations; however, the huddle participant may only view the content which the huddle leader may be showing during huddle time. After the huddle session may have ended at step 328, the huddle participant may leave the huddle board. Subsequently at step 330, the huddle participant may determine whether there is a need to enter another huddle board. If there is a need to enter another huddle at step 330, then, huddle management system may display the user's huddle boards navigation UI at step 308, which may allow the huddle participant to select another huddle board at step 310. Otherwise, the huddle participant may exit huddle collaboration system at step 332, and method 300 may end.

In another embodiment, if a determination is made at step 314, that there is no need to join a huddle in an active session, then the user may select to view the content in the huddle which may be available to the user in the form of one or more sub-applications according to the huddle configurations. At step 344, the user may select one of the available sub-applications in order to view with further details and/or edit the content in the selected sub-application at step 346. Afterwards, if there is a need to enter another sub-application at step 348, then at step 344, huddle management system may display the huddle summary UI to the user enabling him/her to select another sub-application at step 346. If there is no need to enter another sub-application at step 348, but there is a need to enter another huddle at step 330, then, huddle management system may display the user's huddle board navigation UI at step 308, which may allow him/her to select another huddle board at step 310. Otherwise, the user may exit huddle collaboration system at step 332, and method 300 may end.

Figure 4:
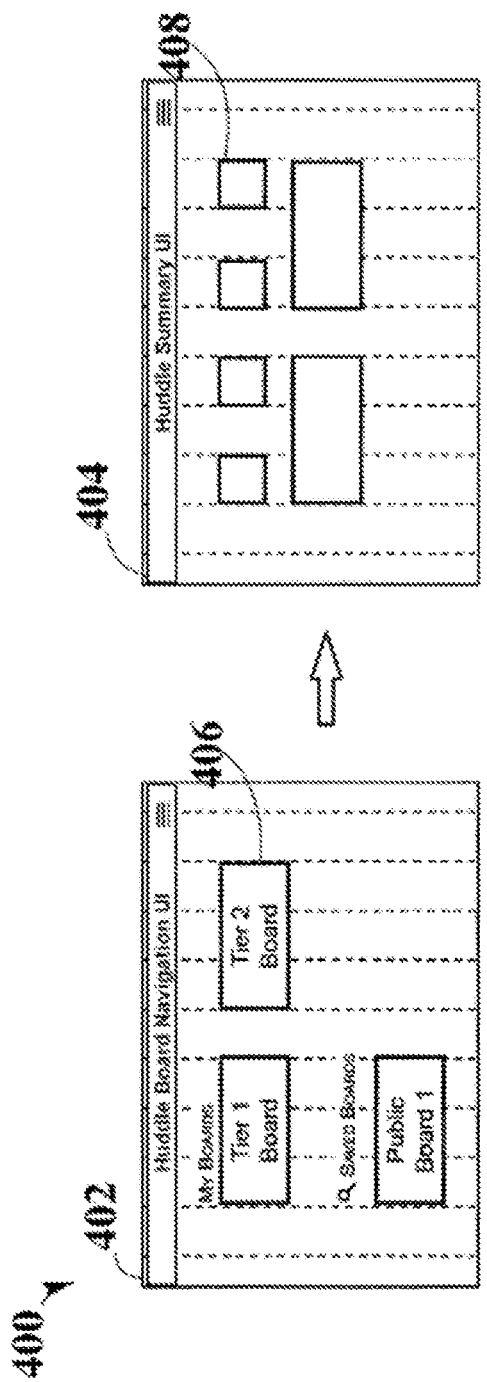
FIG. 4 is an exemplary embodiment of the layout and navigation of a huddle board navigation UI and a huddle summary UI.

FIG. 4 is an illustration 400 of the navigation between a Huddle board navigation UI 402 and a huddle summary UI 404. The huddle board navigation UI 402 may display the list of huddle boards 406 where the user participates or has authorized access. The user may select to enter a huddle board 406 from the list displayed in the huddle board navigation UI 402 at which point the user is displayed the huddle summary UI 404 for the huddle board 406 selected. The user may navigate through the UI displays using know in the art devices and navigation methods, such as point and click, drag and drop, touch screen etc. Huddle summary UI 404 may display sub-applications 408 for the selected huddle board 406.

Figure 5:
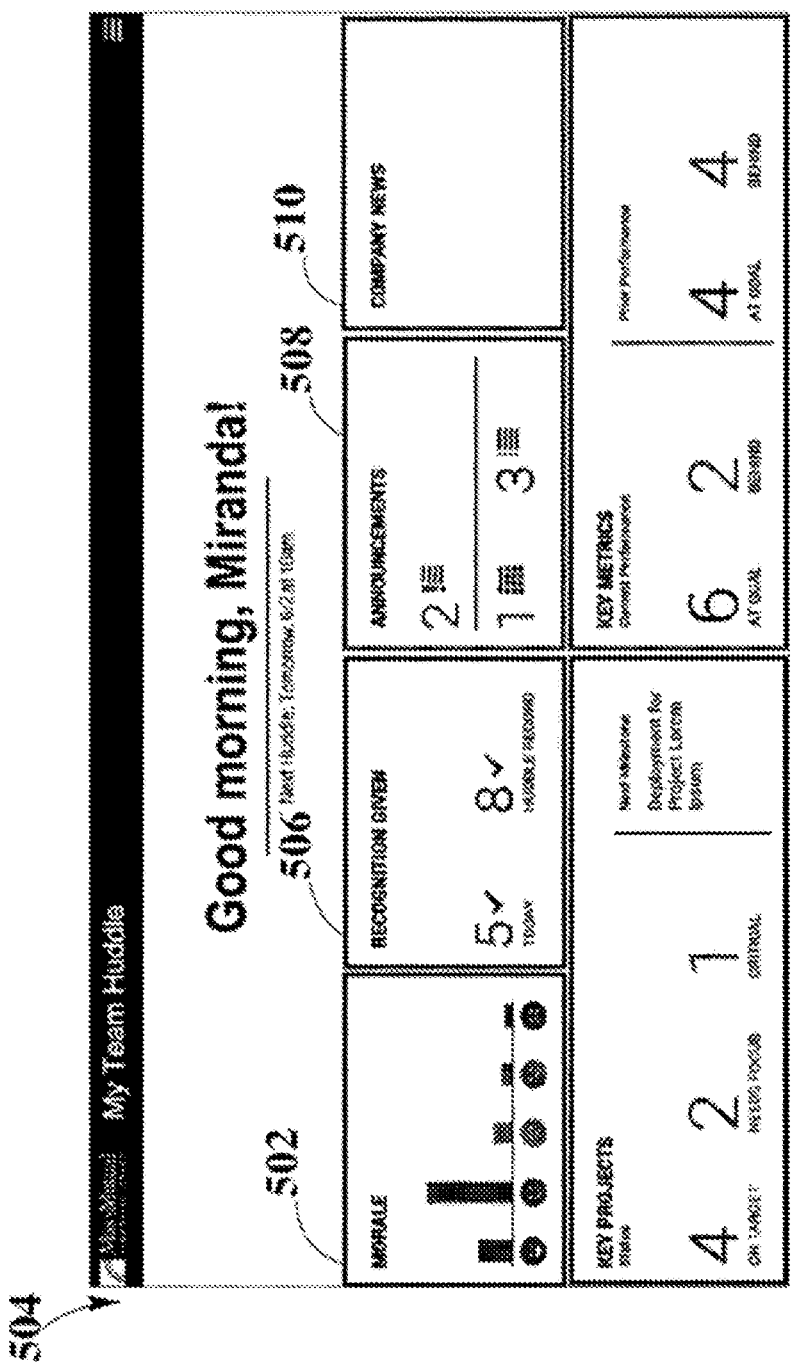
FIG. 5 shows an exemplary user interface of a user's huddle summary, according to a further embodiment.

FIG. 5 shows an exemplary user interface of a user's huddle summary UI 504, according to a further embodiment.

According to some embodiments of the present disclosure, huddle summary UI 504 user interface may enable one or more users, such as a huddle leader and a huddle participant of an organization, to preview all the sub-applications in the huddle board, and each sub-application may display a summary-level view of the data it may contain. Huddle summary UI 504 may include sub-applications which may be part of a standard or preselected set of sub-applications for every user's huddle such as morale 502, recognition 506, announcements 508, company news 510 (e.g., FYI news feed), and dates/calendar, among others. These standard sub-applications may include pre-defined content and may have standard layout in the huddle board. Morale 502 may be an image and text-based sub-application which may be used by each user to indicate their feeling before every huddle, by selecting an image from a library and expressing an optional statement of, for example less than 140 characters. Recognition 506 may be a text-based sub-application which may be used as a place where users can recognize with a statement of, for example less than 140 characters, anyone they have worked with for exceptional work. Announcements 508 may be a text-based sub-application which may be used for users to share important events and/or news with the rest of the team. Company news 510 may be text-based which may provide news and alerts relevant to all the company's employees and may also provide significant news that should be communicated to all the huddle members during active huddle.

Exemplary Processes for Capturing, Predicting, and Suggesting Preferences

The system may capture data from each user navigation and selections in order to provide suggestions or predict user preferences.

Figure 6:
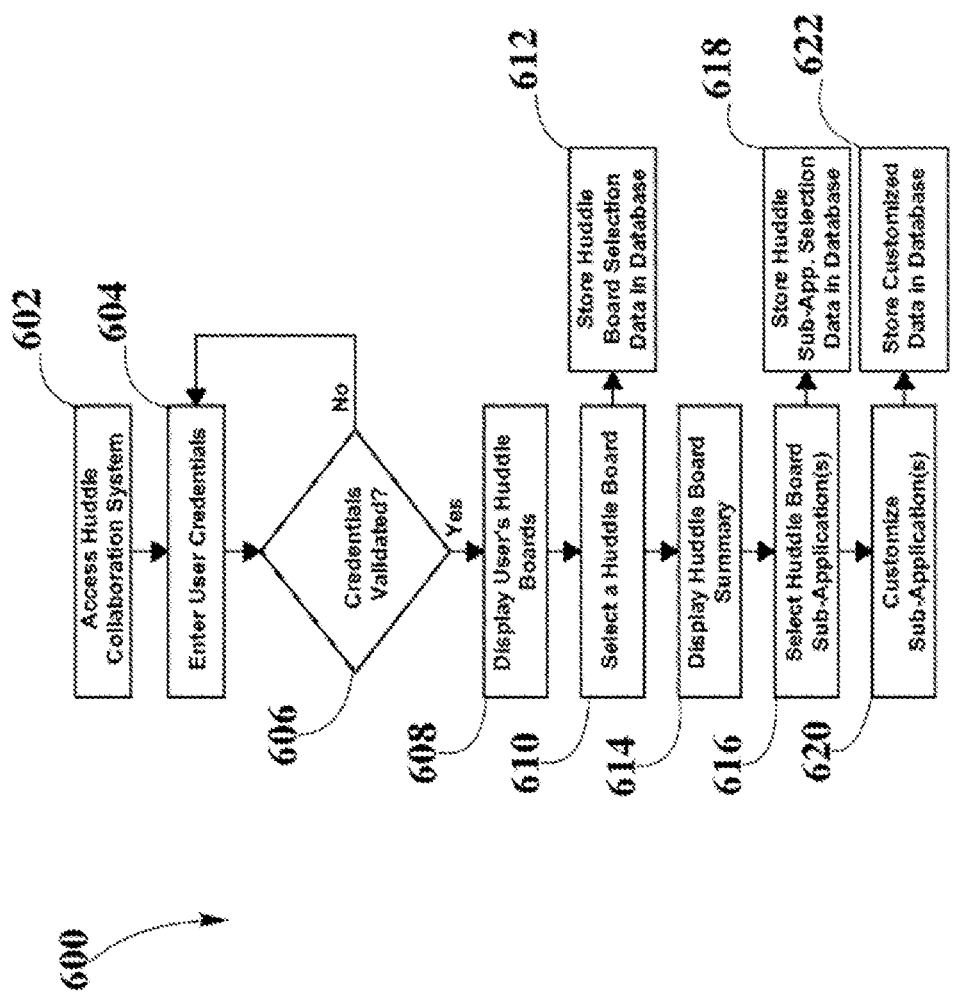
FIG. 6 illustrates a process for capturing user navigation and customization data for analysis on preferences or customizations.

FIG. 6 is a method 600 illustrating the process for capturing user data.

Method 600 may start when a user, such as a huddle leader or a huddle participant within an organization, may access 602 the huddle collaboration system using a client computing device. This huddle collaboration system may generate a login screen as an initial user interface, through which the user may enter 604 his/her company's credentials, via an input device such as a touch screen, a mouse, a keyboard, a keypad, and others. If the authentication module operating within huddle management system of huddle collaboration system can validate 606 the user's credentials, then, the huddle collaboration system may display 608 the huddle board navigation UI that may include a list of the huddle boards in which the user may be participating in and a list of public boards, where these public boards may be viewed by anyone in the organization and may be edited by authorized users. Otherwise, the huddle collaboration system may request the user to enter 604 his/her credentials at least one more time or deny access.

The users may then select a huddle board 610, for which they want access from the huddle board navigation UI via an input device such as a mouse, keyboard, touch screen and the like. A parallel process may then store the huddle board selection (step 612) in the database for processing. The information stored may include the huddle board selected, user information, time, day, date and/or any other metadata that may be analyzed in order to predict user preferences. The huddle collaboration system may then display the huddle summary UI at step 614. From the huddle summary UI the user may select any of the sub-applications for the specific huddle board selected (step 616). A parallel process may also store the huddle board sub-application selection (step 618) in the database for further processing. The information stored may include the huddle board selected, sub-application selected, user information, time, day, date and/or any other metadata that may be analyzed in order to predict user preferences.

The huddle collaboration system may also allow optional customization of sub-applications and may also allow optional customizations to the huddle summary UI (step 620). Sub-applications may contain configurable content, title, layout, and may also have configurable metrics that allow for personalization of content. Examples of custom sub-applications may include key projects, custom data tables, field metrics, leader standard work, customer sentiment, and employee sentiment, KPI among others. Accredited users may access, by means of a computing device, the huddle board summary interface to change a sub-application position within the huddle board summary space to optimize presentation of content to users. Users can specifically position sub-applications within the huddle board summary. For example, a user may employ a computing device to group sub-applications associated with work-related projects in the lower left portion of the huddle board summary while grouping sub-applications associated with a user's personal life in the upper right portion of the huddle board summary. Any customization data that the user performs on sub-applications or huddle summary UI may be stored in the database (step 622) for further processing. The information stored may include the huddle board selected, user information, time, data and/or any other metadata that may be analyzed in order to predict user preferences.

The user navigation and customization data collected using the process depicted in FIG. 6 may be analyzed by a data processing module in the huddle collaboration system. The data processing module may include programmatic rules, logic or/and conditions that may provide analysis on the user behavior in order to provide suggestions or automatically configure settings according to user preferences. For example, the data processing module may count how many times a user has accessed a specific huddle board, at what time and at what day or date. If the count meets a previously established threshold, a suggestion may be presented to the user through a prompt asking if the user would like to automatically access that specific huddle board every time he accesses the huddle collaboration board at the same day or hour. If the user agrees to the configuration, the next time they access the huddle board collaboration system they user may be directly presented with the huddle summary UI for the specific huddle board.

In another embodiment, data processing module may also suggest a user customizations and navigation options based on preferences of other users that share similarities with them. For example: users that belong to a same division, group, gender and the like.

Example #1 is an examplary embodiment where a user "A" recurringly accesses a huddle board "M". In example #1 the user "A" continually accesses a huddle board "M" every Monday between 9:00 a.m. and 11:00 a.m. Every time the user "A" accesses huddle board "M" a record may be added to the database including the day, user, hour, huddle board accessed and/or any other information that may be used to determine a trend or user preference. A data processing module may keep a count of every time the pattern for accessing the huddle board "M" is repeated by user "A". The data processing module may include a condition statement implemented through programming methodologies that compares a count of the number times user "A" has accessed the huddle board "M" on a Monday and between 9:00 a.m. and 11:00 a.m., against previously established thresholds. If the number of times the user "A" accesses huddle board "M" on Mondays between 9:00 a.m. and 11:00 a.m. exceeds any thresholds previously established, then this might serve as an indication that user "A" has a preference for accessing that huddle board during that day and within that range of time. The system may then present the user with a suggestion to allow the system to automatically open the huddle board "M" every Monday between 9:00 a.m. and 11:00 a.m.

Example #2 is an examplary embodiment where a user "A" accesses a specific sub-application "S" from huddle summary UI for huddle board "X". A record may be added including the huddle board accessed, user information, sub-application accessed and/or any other information that may be used to determine a trend or user preference. A data processing module may keep a count of every time the pattern for accessing sub-application "S" from huddle summary UI for huddle board "X" is repeated by user "A". The data processing module may include a condition statement implemented through programming methodologies that compares a count of the number of times user "A" has accessed the sub-application "S" from huddle summary UI for huddle board "X". If the number of times the user "A" accesses sub-application "S" from huddle summary UI for huddle board "X" exceeds any thresholds previously established, then this may serve as an indication that user "A" has a preference for accessing that sub-application "S" whenever the user accesses huddle board "X". The system may then present the user with a suggestion to allow the system to automatically open the sub-application "S" whenever the user accesses huddle board "X".

Example #3 is an exemplary embodiment where a user "A" customizes the layout of the huddle summary UI. User "A" may repeatedly customize the huddle summary UI for each huddle board they may have access to in order to satisfy preferences or needs. Each time user "A" customizes the huddle summary UI a record may be stored in the database for each customization made to the UI. A data processing module may keep a count of every type of customization repeated by user "A". The data processing module may include a condition statement implemented through programming methodologies that compare the count of every type of customization repeated by user "A" against previously established thresholds. If the count for a specific types of customizations exceed a previously established threshold, then this may serve as an indication that user "A" has a preference for those types of customizations. The system may then present the user with a suggestion to allow the system to automatically apply those customizations whenever the user accesses the huddle summary UI of a new or non-customized huddle board.

Example #4 is an exemplary embodiment where previously determined preferences from a user "A" and "B" are suggested to a user "C". The system may include additional data from users such as organization, division, age, gender and the like. In this example, users "A", "B" and "C" belong to the same division. The system may store individual user navigation and customization records. A data processing module may keep a count of every type of customization repeated by user "A". The data processing module may include a condition statement implemented through programming methodologies that compare the count of every type of customization repeated by user "A" against previously established thresholds. If the count for a specific types of customizations exceed a previously established threshold, then this may serve as an indication that user "A" has a preference for those types of customizations. The data processing module may also keep a count of every type of customization repeated by user "B". The data processing module may include a condition statement implemented through programming methodologies that compare the count of every type of customization repeated by user "B" against previously established thresholds. If the count for a specific types of customizations exceed a previously established threshold, then this may serve as an indication that user "B" has a preference for those types of customizations. If user "A" and user "B" share the same customization preferences, then this may serve as an indication that user "C" may also share the same preferences. The system may then present user "C" with a suggestion to allow the system to automatically apply those customizations whenever the user accesses the huddle summary UI of a new or non-customized huddle board.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A server-implemented method comprising:
   generating, by a server, a session for an interaction between a plurality of user computing devices presenting a huddle board, wherein the huddle board comprises a plurality of sub-applications;
   displaying, by the server, a huddle board display page on each of the plurality of user computing devices during the session, wherein the huddle board display page for each user computing device contains at least one sub-application of the plurality of sub-applications based on a selection of the at least one sub-application from that user computing device;
   determining, by the server, a number of times of a selection of one or more sub-applications of the plurality of sub-applications performed on the huddle board display page by each user computing device;
   presenting, by the server, an electronic message for inclusion of the one or more sub-applications on each user computing device based on the number of times;
   in response to receiving a confirmation from at least one of the plurality of user computing devices, presenting, by the server, a modified huddle board display page with the one or more sub-applications on the at least one of the plurality of user computing devices; and
   when the number of times each user computing device accesses at least two sub-applications in a same pattern exceeds a previously established threshold value, selecting, by the server, the at least two sub-applications for inclusion on the huddle board display page.

2. The server-implemented method according to claim 1, further comprising:
   editing, by the server, the plurality of sub-applications on receiving an editing request from the at least one of the plurality of user computing devices.

3. The server-implemented method according to claim 1, further comprising:
   presenting, by the server, the electronic message for inclusion of the one or more sub-applications on each user computing device when the number of times exceeds a predetermined threshold value.

4. The server-implemented method according to claim 1, further comprising:
   determining, by the server, the pattern in which each user computing device accesses the at least two sub-applications of the plurality of sub-applications during the session.

5. The server-implemented method according to claim 4, wherein each user computing device accesses the at least two sub-applications by activating the at least two sub-applications.

6. The server-implemented method according to claim 5, further comprising:
   counting, by the server, the number of times each user computing device accesses the at least two sub-applications during the session.

7. The server-implemented method according to claim 1, further comprising:
   measuring, by the server, a display time of each of the plurality of sub-applications accessed on the huddle board display page by each user computing device.

8. The server-implemented method according to claim 7, further comprising:

comparing, by the server, the display time associated with each of the plurality of sub-applications with a predetermined time value.

9. The server-implemented method according to claim 8, further comprising:
selecting, by the server, a set of sub-applications from the plurality of sub-applications for inclusion on the huddle board display page when the display time for the set of sub-applications is more than the predetermined time value.

10. A system comprising:
a server comprising a processor and a non-transitory computer-readable medium containing instructions that when executed by the processor causes the processor to:
generate a session for an interaction between a plurality of user computing devices presenting a huddle board, wherein the huddle board comprises a plurality of sub-applications;
display a huddle board display page on each of the plurality of user computing devices during the session, wherein the huddle board display page for each user computing device contains at least one sub-application of the plurality of sub-applications based on a selection of the at least one sub-application from that user computing device;
determine a number of times of a selection of one or more sub-applications of the plurality of sub-applications performed on the huddle board display page by each user computing device;
present an electronic message for inclusion of the one or more sub-applications on each user computing device based on the number of times;
in response to receiving a confirmation from at least one of the plurality of user computing devices, present a modified huddle board display page with the one or more sub-applications on the at least one of the plurality of user computing devices; and
when the number of times each user computing device accesses at least two sub-applications in a same pattern exceeds a previously established threshold value, select the at least two sub-applications for inclusion on the huddle board display page.

11. The system according to claim 10, wherein the server is further configured to:
edit the plurality of sub-applications on receiving an editing request from the at least one of the plurality of user computing devices.

12. The system according to claim 10, wherein the server is further configured to:
present the electronic message for inclusion of the one or more sub-applications on each user computing device when the number of times exceeds a predetermined threshold value.

13. The system according to claim 10, wherein the server is further configured to:
determine the pattern in which each user computing device accesses the at least two sub-applications of the plurality of sub-applications during the session.

14. The system according to claim 13, wherein each user computing device accesses the at least two sub-applications by activating the at least two sub-applications.

15. The system according to claim 14, wherein the server is further configured to:
count the number of times each user computing device accesses the at least two sub-applications during the session.

16. The system according to claim 10, wherein the server is further configured to:
measure a display time of each of the plurality of sub-applications accessed on the huddle board display page by each user computing device.

17. The system according to claim 16, wherein the server is further configured to:
compare the display time associated with each of the plurality of sub-applications with a predetermined time value.

18. The system according to claim 17, wherein the server is further configured to:
select a set of sub-applications from the plurality of sub-applications for inclusion on the huddle board display page when the display time for the set of sub-applications is more than the predetermined time value.

* * * * *